(12) United States Patent
Ene et al.

(10) Patent No.: US 12,511,468 B2
(45) Date of Patent: Dec. 30, 2025

(54) METHOD, SYSTEM, PROGRAM, AND MEDIUM FOR ACCESS TO PAYWALLED SITE WITHOUT USER TRACKING

(71) Applicant: Supertab AG, Steinhausen (CH)

(72) Inventors: Cosmin-Gabriel Ene, Zollikon (CH); Jesse Knight, Scarborough, ME (US)

(73) Assignee: Supertab AG, Steinhausen (CH)

( * ) Notice: Subject to any disclaimer, the term of this patent is extended or adjusted under 35 U.S.C. 154(b) by 209 days.

(21) Appl. No.: 18/387,957

(22) Filed: Nov. 8, 2023

(65) Prior Publication Data

US 2025/0061264 A1    Feb. 20, 2025

(30) Foreign Application Priority Data

Aug. 16, 2023   (IE) ..................................... 2023/0335

(51) Int. Cl.
*G06F 40/106*    (2020.01)
(52) U.S. Cl.
CPC .................. *G06F 40/106* (2020.01)

(58) Field of Classification Search
None
See application file for complete search history.

(56) References Cited

U.S. PATENT DOCUMENTS

| | | | |
|---|---|---|---|
| 2020/0302413 A1* | 9/2020 | Moiseenko | H04L 63/10 |
| 2022/0101287 A1* | 3/2022 | Hust | G06Q 20/127 |
| 2022/0188376 A1* | 6/2022 | Petty | G06F 16/13 |
| 2022/0318521 A1* | 10/2022 | Ray | G06F 40/232 |
| 2022/0383396 A1* | 12/2022 | Haapoja | G06Q 30/0639 |
| 2022/0383397 A1* | 12/2022 | Haapoja | G06Q 30/0643 |

\* cited by examiner

*Primary Examiner* — Toan H Vu

(57) ABSTRACT

A computer-implemented method is provided to prevent user tracking of a user device by an operator associated with a paywalled content site by a) receiving, at an intermediary site a request for a URL associate with a paywalled content site, b) forwarding the URL to a virtual machine; c) requesting, by the virtual machine, paywalled content using the URL and using credentials for the paywalled content; d) receiving the paywalled content at the virtual machine; e) rendering the paywalled content as an image frame in a frame buffer; f) creating a video stream or image based on the frame buffer; and g) displaying the video stream or the image at the user device.

18 Claims, 4 Drawing Sheets

METHOD, SYSTEM, PROGRAM, AND MEDIUM FOR ACCESS TO PAYWALLED SITE WITHOUT USER TRACKING

CROSS-REFERENCE TO RELATED APPLICATIONS

This application which claims priority to Ireland Patent Application No. S2023/0335 filed Aug. 16, 2023, which is hereby incorporated by reference in its entirety herein.

FIELD OF INVENTION

The invention relates to a method, system, program and medium for access to paywalled site without user tracking.

BACKGROUND

There is an obstacle to sharing paywalled content due to complicated case-by-case integration. Each integration with a new partner typically requires special publishing software installation. There is also a risk to consumers of paywalled content in that the consumer is tracked and/or exposed to malicious software. A further issue with available content sharing is the risk of the shared content interfering with originators' search engines optimisation. Available sharing of paywalled content also risks text copying.

SUMMARY OF THE INVENTION

The invention aims to address these issues.

Solution

The objectives are achieved by a computer-implemented method comprising the steps of:
a) receiving, at an intermediary site, preferably from a user device, a request for a URL associate with a paywalled content site, preferably associated with content within the paywalled content site;
b) forwarding the URL to a virtual machine;
c) requesting, by the virtual machine, paywalled content using the URL and using credentials for the paywalled content available at the virtual machine;
d) receiving, in response to the request, the paywalled content at the virtual machine;
e) rendering the paywalled content as at least one image frame in a frame buffer on the virtual machine or receiving image frames to be stored in a frame buffer on the virtual machine;
f) creating a video stream based on the frame buffer or storing the content of the frame buffer as an image at the virtual machine; and
g) displaying the video stream or the image as part of intermediary site content provided at the user device.

Rendering the paywalled content in step e) may be based on HTML content of the paywalled content, and may be rendered using a HTML browser to store the paywalled content in the frame buffer. It may also be rendered by using functionality to export HTML content of the paywalled content in a PDF file format, and thereafter using functionality of a PDF viewer to render the paywalled content in a frame buffer. If the paywalled content is already in the PDF file format, a PDF viewer may directly render the paywalled content in the frame buffer. If a special application is needed to access the paywalled content, this application may be run on the virtual machine to access the paywalled content, and the same application may be used to render the paywalled content in the frame buffer. PDF may have links preserved, or restricted.

Video streams created in step f) may be in the mpeg mp4, WebM, mov, avi, flv, or any other open or proprietary format. Image created in step f) may be in the jpeg, png, gif, svg, tiff, bmp, raw, of any other open or proprietary format.

Creating an image in step f) may be accomplished using printing functionality, e.g. within a browser, such as functionality to print to image file, or to print to PDF file, or using screenshot applications available at the virtual machine.

Advantage include avoiding publisher integration issues and avoiding publishing software installation. Publishers further do not need syndicating content. User has secure access to content and avoiding risk of tracking. Cookies will at most be stored at the virtual machine. Any publisher or third party advertisement tracking will at most get information and track information about the virtual machine. The end user is shielded. Since advertisement may still be rendered at the virtual machine, advertisement may be included in the rendered images or video stream. Advertisement may also be targeted, by extracting interest from the visited article or page, but not based on other sites the user visits outside the system. Alternatively, ad-blockers are provided at the virtual machine, to remove advertisement from the paywalled content. The solution also avoids publisher content search engine interfering and allows publishers to maintain control of content, such as preventing text copying.

Using a virtual server that is logged into a paywalled site, a user is able to view content via video screen capture of that site, thereby circumventing the paywall and facilitating easy publisher integration.

In one embodiment, the method further comprising the step:
h) displaying the video stream or the at least one image on a display of the user device.

In one embodiment, in step b), a user device screen resolution is further forwarded to the virtual machine, and rendering the paywalled content in step e) is adapted to the screen resolution. Alternatively, any other size indication like the size of a displaying window or frame, e.g. within another application can be communicated to the virtual machine. The virtual machine can output the video stream in a manner that takes into consideration the size indication. Thereby the relevant information is transported most efficiently.

In one embodiment, the URL to the paywalled content site is requested as HTTP GET or HTTP POST parameters as part of a second URL locating the intermediary site, and the second URL is received at the user device from a partner site.

The intermediary site content may be provided within an intermediary site application "an app" on the user device. In this case, a separate intermediary site may not be needed, and the functionality of the intermediary site may be provided within the app on the user device.

In one embodiment, a bi-directional connection is maintained between the user device and the Virtual Machine; wherein user navigation instructions, such as scrolling up and down, is forwarded from the user device to the virtual machine; wherein the rendered paywalled content is navigated within a browser of the virtual machine according to the instructions; and wherein the navigation of the rendered paywalled content within the browser is captured as the video stream, or as a new image if navigation is outside the image already captured. Of course it needs to be understood that the browser as captioned above can be substituted by any type of software component that behaves like a browser, e.g. issues HTTP requests or posts. In the following the term browser is used for a browser as commonly understood as well as the substituting component.

In one embodiment, the paywalled content is static content, such as text and/or images.

In one embodiment, the paywalled content is dynamic content, such as audio, video and/or interactive content, such as computer games.

In one embodiment, downloads and/or external links are disabled in the paywalled content. In certain embodiments, user interaction in the form of click is forwarded to the virtual machine, and links selectively activated and forwarded to the paywalled content site. Selection may be based on list or allowable and/or denied URLs, such as based on domain name. E.g. only allowing browsing within the paywalled content site, and disabling links to content outside the published content site.

In one embodiment, the credentials for the paywalled content site are looked up, such as in a lookup table, at the virtual machine preferably based on a domain name part of the URL.

The objectives of the present invention are further achieved by a data processing system comprising: a user device; an intermediary site; a virtual machine; a paywalled content site; wherein the system is configured to perform the one of the herein-described methods. The above captioned component can be hosted within a single virtual environment and/or distributed across several virtual environments and/or hardware components. In addition, the virtual machine can as a software component be hosted on the intermediate site or other entities like the above described partner site.

The objectives of the present invention are further achieved by a computer program comprising instructions which, when the program is being executed by one or more computers, cause the computers to carry out one of methods as captioned above.

The objectives of the present invention are further achieved by a computer-readable medium comprising instructions which, when executed by one or more computers, cause the one or more computers to carry out the one embodiment of methods as described herein.

The advantages of the described system, program and medium, is equal or similar to the advantages of the herein described method.

BRIEF DESCRIPTION OF THE DRAWINGS

In the following, embodiments of the invention are described with respect to the figures, wherein.

DETAILED DESCRIPTION

Figure 1:
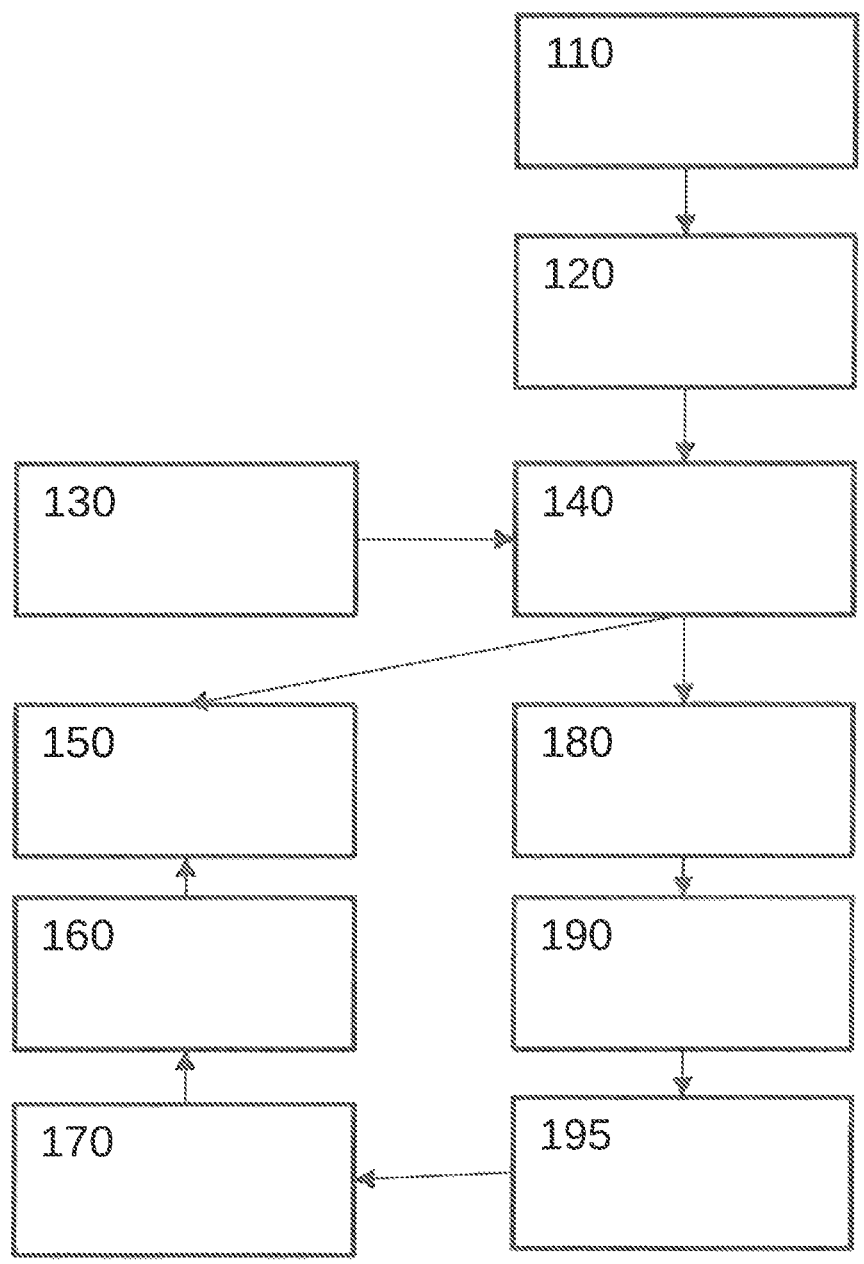
FIG. 1 shows a procedure of providing access to paywalled content sites without user tracking according to an embodiment.

FIG. 1 shows a procedure of using a virtual server 420 that is logged into a paywalled site 410, a user is able to view content via video screen capture or image capture of that site, thereby allowing targeted advertisement while preventing user tracking.

First, an intermediary actor procures access/subscription to a paywalled content site 410 (e.g. paywalled Publisher site). Second, a virtual machine/container (Content Virtual Machine) 420 is setup with credentials for access the paywalled content site, and displays e.g. a web browser that is logged into the paywalled content site using the credentials. The virtual machine may be logged into all participating paywalled content sites via browser sessions. 130: Through a partner 450, a user requests an article from a paywalled content site using a URL, and is directed to an intermediary site, e.g. the site "content.supertab.co".

Next, the URL to the paywalled content is read by the intermediary site 430. The intermediary site 430 may also read the user's screen resolution. The virtual machine 420 is instructed to render the paywalled content article URL. If user's screen resolution is available, the browser window is set to the appropriate size for the user's device.

The content virtual machine 420 establishes a live video screen capture stream or an image capture of the rendering results as provided by the e.g. web browser and sends the result back such as to the reader view on the intermediary site 430, e.g. content.supertab.co. Screen capture may be driven through WebRTC (Web Real-Time Communication). The stream and or image may be transported via a direct connection between the user device 440 and the virtual machine 420, or it may be routed through the intermediary site 430.

A reader view may be opened on the user device showing content of the intermediary site 430, consisting e.g. a top frame with a logo, current Tab status, and navigation menu, and a frame that show the desired URL content streamed from the virtual machine 420. The user may interact with e.g. navigate the reader view through a simplified web interface that allows the user to scroll the page and for basic interaction. These actions may be transmitted to the virtual machine 420, which then performs the actions on its browser, and renders the result which in turn is captured as video and/or as image. (In one embodiment, the browser is locked down such that the user could not load other pages or do anything but scroll and interact with the page. Key commands would be disabled).

The user device 440 virtual machine 420 may maintain a continuous bi-directional communication allowing the user's instructions to be sent to the server and the server's video to be sent to the client. This connection could be facilitated by websockets or other real-time communication technologies.

Figure 2:
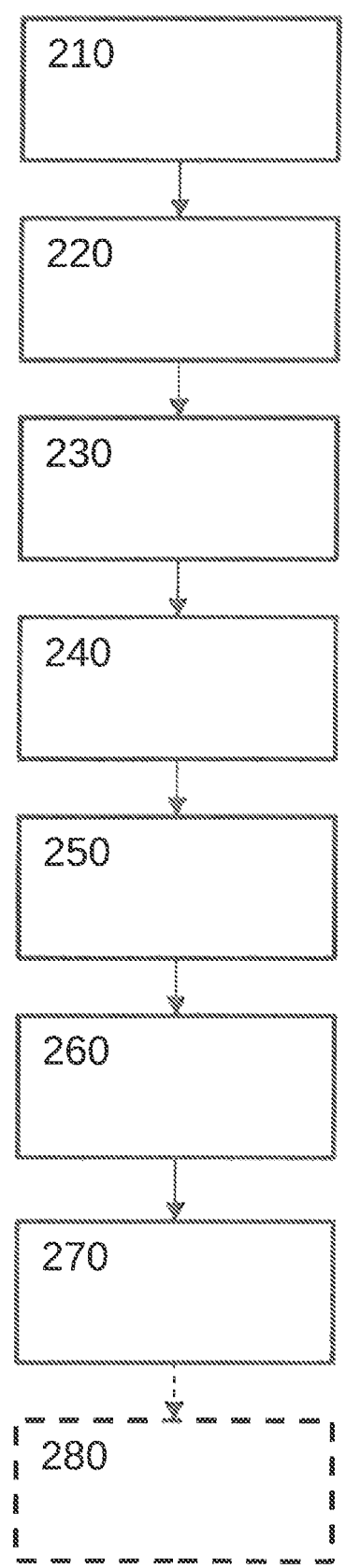
FIG. 2 depicts a computer-implemented method according to an embodiment of the present invention.

FIG. 2 depicts a computer-implemented method according to an embodiment of the present invention, comprising the steps of: a) receiving 210, at an intermediary site 430, preferably from a user device 440, a request for a URL associate with a paywalled content site 410, preferably associated with content within the paywalled content site; b) forwarding 220 the URL to a virtual machine 420; c) requesting 230, by the virtual machine 420, paywalled content using the URL and using credentials for the paywalled content available at the virtual machine 420; d) receiving 240, in response to the request, the paywalled content at the virtual machine 420; e) rendering 250 the paywalled content as at least one image frame in a frame buffer on the virtual machine 420 or receiving image frames to be stored in a frame buffer on the virtual machine; f) create 260 a video stream based on the frame buffer or storing the content of the frame buffer as an image at the virtual machine 420; and g) displaying 270 the video stream or the image as part of intermediary site content provided at the user device 440.

Figure 3:
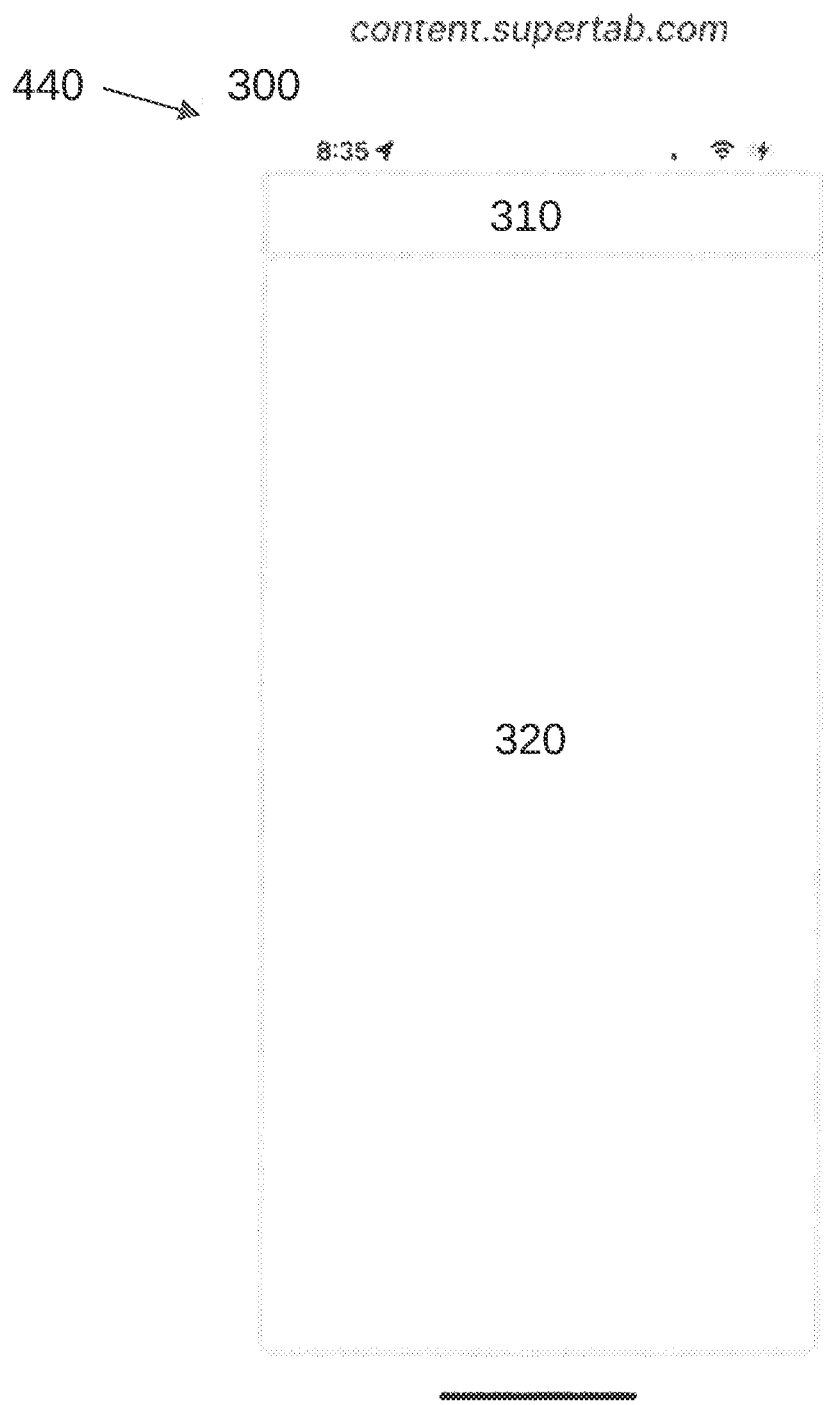
FIG. 3 depicts a user device according to an embodiment of the present invention.

FIG. 3 depicts a display 300, on a user's device 440 showing exemplary intermediary site content. The Figure may comprise a logo, a tab, a hamburger menu bar 310, and a frame comprising paywalled site content 320 rendered as video stream or image content.

A hamburger menu is typically three stacked lines that indicate a hidden menu. When the lines are clicked or tapped on, a menu slides into view or a drawer appears. The menu holds a list of navigation items or other elements that users can access.

Figure 4:
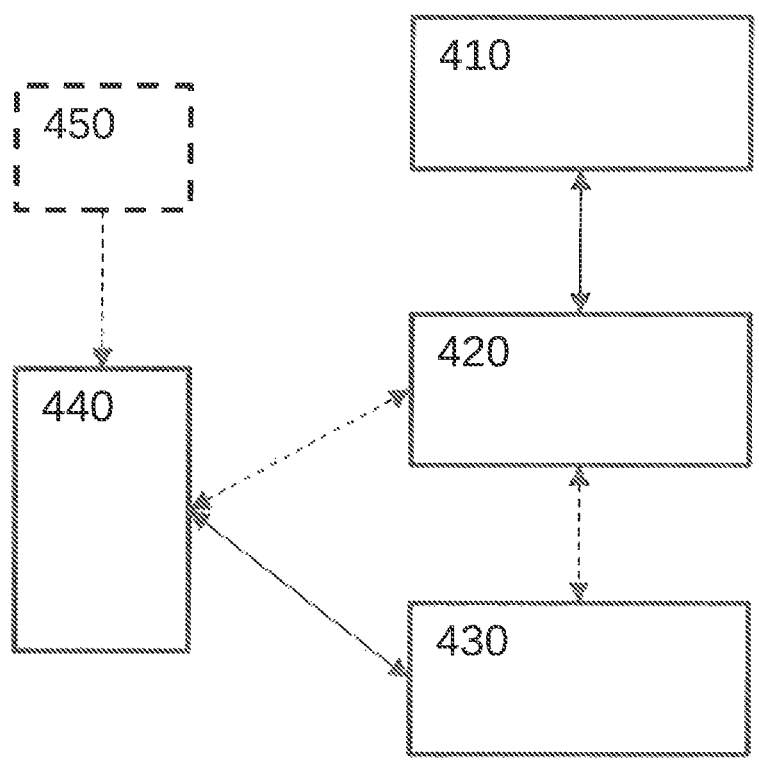
FIG. 4 depicts a system according to an embodiment of the present invention.

FIG. 4 depicts a system according to the present invention, comprising paywalled content sites 410, a virtual machine 420, an intermediary site 430, and a user device 440. User device 440 requests paywalled content as part of communication with an intermediary site 430. The virtual machine, either directly from the user device, or via the intermediary site, receives the request for the paywalled content. The virtual machine access the paywalled content site using paywalled credentials. The response is rendered at the virtual machine as image frames, which are captured as a video stream or as an image at the virtual machine. The video stream or image is received by the user device, either directly from the virtual machine, or via the intermediary site.

It will be understood that, while various aspects of the present disclosure have been illustrated and described by way of example, the invention described herein is not limited thereto, but may be otherwise variously embodied as suggested by the disclosure and as indicated within the scope of the following exemplary claims. For instance, despite the disclosure pertaining to a system and method for the rendering of a virtual world, such a system or method may additionally be implemented in an augmented-reality or holographic system, or the like, in accordance with the previously described invention.

LIST OF REFERENCES

- 110 intermediary site actor procures access/subscription to a paywalled content site
- 120 a virtual machine/container is setup and displays a web browser that is logged into the paywalled content site using credentials received during the above step. The browser would be logged into all participating paywalled content sites.
- 130 through an intermediary site partner, a user requests an article from a paywalled content site using a URL to paywalled content, and is directed to an "intermediary site", e.g. the site "content.supertab.co".
- 140 the URL to paywalled content is read by the intermediary site. The intermediary site also reads the user's screen resolution.
- 150 the virtual machine is instructed to render the paywalled article URL
- 160 based on the user's screen resolution, the browser window is set to the appropriate size for the user's device.
- 170 the Content Victual Machine establishes a live video screen capture stream of the web browser displaying the paywalled content site content, and sends the result back to the reader view on the intermediary site, e.g. content.supertab.co. (Screen capture likely driven through WebRTC (Web Real-Time Communication)).
- 180 a reader view is opened on the intermediary site, consisting e.g. a top frame with a logo, current Tab status, and navigation menu, and a frame that show the desired URL video feed from the virtual machine.
- 190 the user interacts with the reader view through a simplified web interface that allows the user to scroll the page and for basic interaction. These actions are transmitted to the virtual machine, which then performs the actions on its browser, and renders the result via video. (The browser would be locked down such that the user could not load other pages or do anything but scroll and interact with the page. Key commands would be disabled).
- 195 the client and server maintain a continuous bi-directional communication allowing the user's interactions to be sent to the server and the server's video to be sent to the client. This connection could be facilitated by websockets or other real-time communication technologies.
- 210 receiving, via an intermediary site, a request for a URL to paywalled content at a user device.
- 220 forwarding the URL from the user device to a virtual machine
- 230 requesting, by the virtual machine, paywalled content using the URL and paywalled credentials available at the virtual machine.
- 240 receiving the paywalled content at the virtual machine
- 250 rendering the paywalled content in a frame buffer on the virtual machine;
- 260 creating a video stream based on buffer at the virtual machine and forwarding the video stream to the user device.
- 270 forwarding the video stream to the user device
- 280 displaying the video stream on the user device
- 300 user device display
- 310 Space for logotype, The Tab, and Hamburger menu
- 320 paywalled content site content
- 410 paywalled content site
- 420 virtual machine
- 430 intermediary site
- 440 user device
- 450 partner site

The invention claimed is:

1. A computer-implemented method comprising the steps of:
   a) receiving at an intermediary site from a user device, a request for a URL associated with a paywalled content site associated with content within the paywalled content site;
   b) forwarding the URL to a virtual machine;
   c) requesting, by the virtual machine, paywalled content using the URL and using credentials for the paywalled content available at the virtual machine;
   d) receiving, in response to the request, the paywalled content at the virtual machine;
   e) rendering the paywalled content as at least one image frame in a frame buffer on the virtual machine or receiving image frames to be stored in a frame buffer on the virtual machine;
   f) creating a video stream based on the frame buffer or storing the content of the frame buffer as an image at the virtual machine; and
   g) displaying the video stream or the image as part of intermediary site content provided at the user device.

2. The method of claim 1, further comprising the step:
h) displaying the video stream on a display of the user device.

3. The method of claim 1, wherein, in step b), a user device (screen) resolution is forwarded to the virtual machine; and
wherein rendering the paywalled content in step e) is adapted to the (screen) resolution.

4. The method of claim 1, wherein the URL to the paywalled content site is requested as HTTP GET or HTTP POST parameters as part of a second URL locating the intermediary site; and
wherein the second URL is received at the user device from a partner site.

5. The method of claim 1, wherein a bi-directional connection is established and/or maintained between the user device and the virtual machine;
wherein user navigation instructions, such as scrolling up and down, is forwarded from the user device to the virtual machine;
wherein the rendered paywalled content is navigated within a browser of the virtual machine according to the instructions; and
wherein the navigation of the rendered paywalled content within the browser is captured as the video stream.

6. The method of claim 1, wherein the paywalled content is static content, such as text and/or images.

7. The method of claim 1, wherein the paywalled content is dynamic content, such as audio, video and/or interactive content, such as computer games.

8. The method of claim 1, wherein downloads and/or external links are disabled in the paywalled content.

9. The method of claim 1, wherein the credentials for the paywalled content site are looked up at the virtual machine based on a domain name part of the URL.

10. A data processing system comprising:
a user device;
an intermediary site;
a virtual machine;
a paywalled content site, said paywall content site having associated paywall content accessible therefrom;
wherein the intermediary site is configured to receive from the user device, a request for a URL associated with a paywalled content site associated with content within the paywalled content site; and further configured to forward the URL to the virtual machine;
wherein the virtual machine is configured to request paywalled content using the URL and using credentials for the paywalled content available at the virtual machine;
wherein the virtual machine is further configured to receive, in response to the request, the paywalled content at the virtual machine;
wherein the virtual machine is further configured to render the paywalled content as image frames in a frame buffer on the virtual machine or receiving image frames to be stored in a frame buffer on the virtual machine; and
wherein the virtual machine is further configured to create a video stream based on the buffer; and forward the video stream to the user device.

11. A non-transitory computer-readable medium having stored thereon instructions for execution by one or more computers, the instructions executable for:

a) receiving, at an intermediary site from a user device, a request for a URL associated with a paywalled content site associated with content within the paywalled content site;
b) forwarding the URL to a virtual machine;
c) requesting by the virtual machine, paywalled content using the URL and using credentials for the paywalled content available at the virtual machine;
d) receiving, in response to the request, the paywalled content at the virtual machine;
e) rendering the paywalled content as at least one image frame in a frame buffer on the virtual machine or receiving image frames to be stored in a frame buffer on the virtual machine;
D) creating a video stream based on the frame buffer or storing the content of the frame buffer as an image at the virtual machine; and
displaying the video stream or the image as part of intermediary site content provided at the user device.

12. A computer-implemented method comprising the steps of:
a) receiving, at an intermediary site from a user device, a request for a URL associated with a paywalled content site associated with content within the paywalled content site;
b) forwarding the URL to a virtual machine;
c) requesting, by the virtual machine, paywalled content using the URL and using credentials for the paywalled content available at the virtual machine;
d) receiving, in response to the request, the paywalled content at the virtual machine;
e) rendering the paywalled content as image frames in a frame buffer on the virtual machine or receiving image frames to be stored in a frame buffer on the virtual machine;
f) creating a video stream based on the frame buffer at the virtual machine; and
g) forwarding the video stream to the user device.

13. A computer-implemented method comprising the steps of:
a) executing a virtual machine on an internet-accessible server;
b) receiving by the virtual machine on the server from a user device, a request for a URL associated with an internet-accessible paywalled content site associated with content within the paywalled content site;
c) transmitting to the URL, by the virtual machine, a request for paywalled content and associated credentials available to the virtual machine for the paywalled content;
d) receiving, in response to the request, the paywalled content at the virtual machine;
e) rendering by the virtual machine in a frame buffer the paywalled content as at least one of (i) at least one image frame, or (ii) the received paywall content in the form of image frames;
f) the virtual machine creating a video stream based on contents of the frame buffer; and
g) displaying at the user device the video stream or the image received from the virtual machine.

14. The computer-implemented method of claim 13, wherein the internet-accessible server executing the virtual machine is accessible to the user device via a virtual machine URL.

15. The computer-implemented method of claim 13, wherein the internet-accessible server executing the virtual machine is part of the user device.

16. A computer-implemented method of a virtual machine executed on an internet-accessible server, the method comprising the steps of:
   a) receiving from a user device, a request for a URL associated with a paywalled content site associated with content within the paywalled content site;
   b) transmitting to the URL a request for paywalled content and credentials for the paywalled content available to the virtual machine;
   d) receiving in response to the request and credentials, the paywalled content;
   e) storing in a frame buffer of the server executing the virtual machine, at least one of (i) the paywalled content as image frames, or (ii) the received image frames of the paywalled content;
   e) creating a video stream based on contents of the frame buffer; and
   f) forwarding the video stream to the user device.

17. The computer-implemented method of claim 16, wherein the internet-accessible server executing the virtual machine is accessible to the user device via a virtual machine URL.

18. The computer-implemented method of claim 16, wherein the internet-accessible server executing the virtual machine is part of the user device.

\* \* \* \* \*